United States Patent [19]

Gellert

[11] Patent Number: 5,460,510
[45] Date of Patent: Oct. 24, 1995

[54] VALVE GATED STACK INJECTION MOLDING APPARATUS

[76] Inventor: Jobst U. Gellert, 7A Prince St., Georgetown, Ontario, Canada, L7G 2X1

[21] Appl. No.: 359,425

[22] Filed: Dec. 20, 1994

[30] Foreign Application Priority Data

Nov. 30, 1994 [CA] Canada .................................. 2137178

[51] Int. Cl.$^6$ .................................................. B29C 45/23
[52] U.S. Cl. .................. 425/562; 264/297.2; 264/328.8; 264/328.15; 425/563; 425/564; 425/570; 425/812
[58] Field of Search ..................................... 425/549, 562, 425/563, 564, 570, 812; 264/29702, 328.8, 328.15

[56] References Cited

U.S. PATENT DOCUMENTS 4,212,626  7/1980  Gellert .
4,891,001  1/1990  Gellert .
4,919,606  4/1990  Gellert .

Primary Examiner—Tim Heitbrink
Attorney, Agent, or Firm—Dalesman & Company

[57] ABSTRACT

Valve gated stack injection molding apparatus with an upstream heated nozzle seated in a fixed mold platen and a downstream heated nozzle seated in a movable mold platen. The melt flows through a melt passage across a parting line from an upstream gate to an aligned downstream gate. A first elongated valve member is reciprocated between a retracted open position and a closed position in which the tip of the valve member is seated in the upstream gate. A second elongated valve member is similarly reciprocated between a retracted open position and a closed position in which the tip of the valve member is seated in the downstream gate. In the closed position, the faces of the tips of the valve members abut against each other along the parting line. One of the valve members has a vent bore extending diagonally from its face to avoid a piece of plastic film being formed from melt trapped between them in the closed position.

2 Claims, 2 Drawing Sheets 5,460,510

VALVE GATED STACK INJECTION MOLDING APPARATUS

BACKGROUND OF THE INVENTION

This invention relates generally to multi-cavity valve gated injection molding apparatus and more particularly to stack molding apparatus having two elongated valve members reciprocating in alignment to control the melt flow during the injection cycle.

Stack molding apparatus to locate cavities on opposing faces of a movable platen is well known. An example of sprue gated stack molding apparatus is shown in the applicant's U.S. Pat. No. 4,891,001 which issued Jan. 2, 1990, while an example of valve gated stack molding apparatus is shown in the applicant's U.S. Pat. No. 4,212,626 which issued Jul. 15, 1980. While valve gated stack molding has been satisfactory for some applications, it has the disadvantage that some melt is trapped between the faces of the tip ends of the valve members when they close together. This forms a circular piece of plastic film which may stick to one of the valve members or elsewhere in the mold and not drop out when the mold opens for ejection. This piece of plastic film can then prevent proper closure of the mold and/or injection during the next injection cycle.

SUMMARY OF THE INVENTION

Accordingly, it is an object of the present invention to at least partially overcome the disadvantages of the prior art by providing valve gated stack molding apparatus wherein the opposing faces of the valve members abut directly against each other in the closed position.

To this end, in one of its aspects, the invention provides valve gated stack molding apparatus in which melt flows through a melt passage and passes from a first gate in a fixed platen to an aligned second gate in a movable platen during a predetermined injection cycle in which the movable platen reciprocates between a first position abutting the fixed platen and a second position separated from the fixed platen along a parting line extending between the first gate and the second gate, including a first elongated valve member with a tip having a face mounted in an upstream nozzle seated in the fixed platen to reciprocate between a retracted open position in which the melt flows through the melt passage around the first valve member to the first gate and a closed position in which the tip of the first valve member is seated in the first gate, and a second elongated valve member with a tip having a face mounted in a downstream nozzle seated in the movable platen in alignment with the first elongated valve member, the second valve member being mounted to reciprocate between a retracted open position in which the melt flows from the second gate through the melt passage around the second valve member and a closed position in which the tip of the second valve member is seated in the second gate, having the improvement wherein at least one of the first and second elongated valve members has a vent bore extending diagonally from the face of the tip to the melt passage extending around the at least one valve member, whereby the faces of the tips of the first and second valve members abut against each other in the closed position.

Further objects and advantages of the invention will appear from the following description taken together with the accompanying drawings.

DETAILED DESCRIPTION OF THE INVENTION

Figure 1:
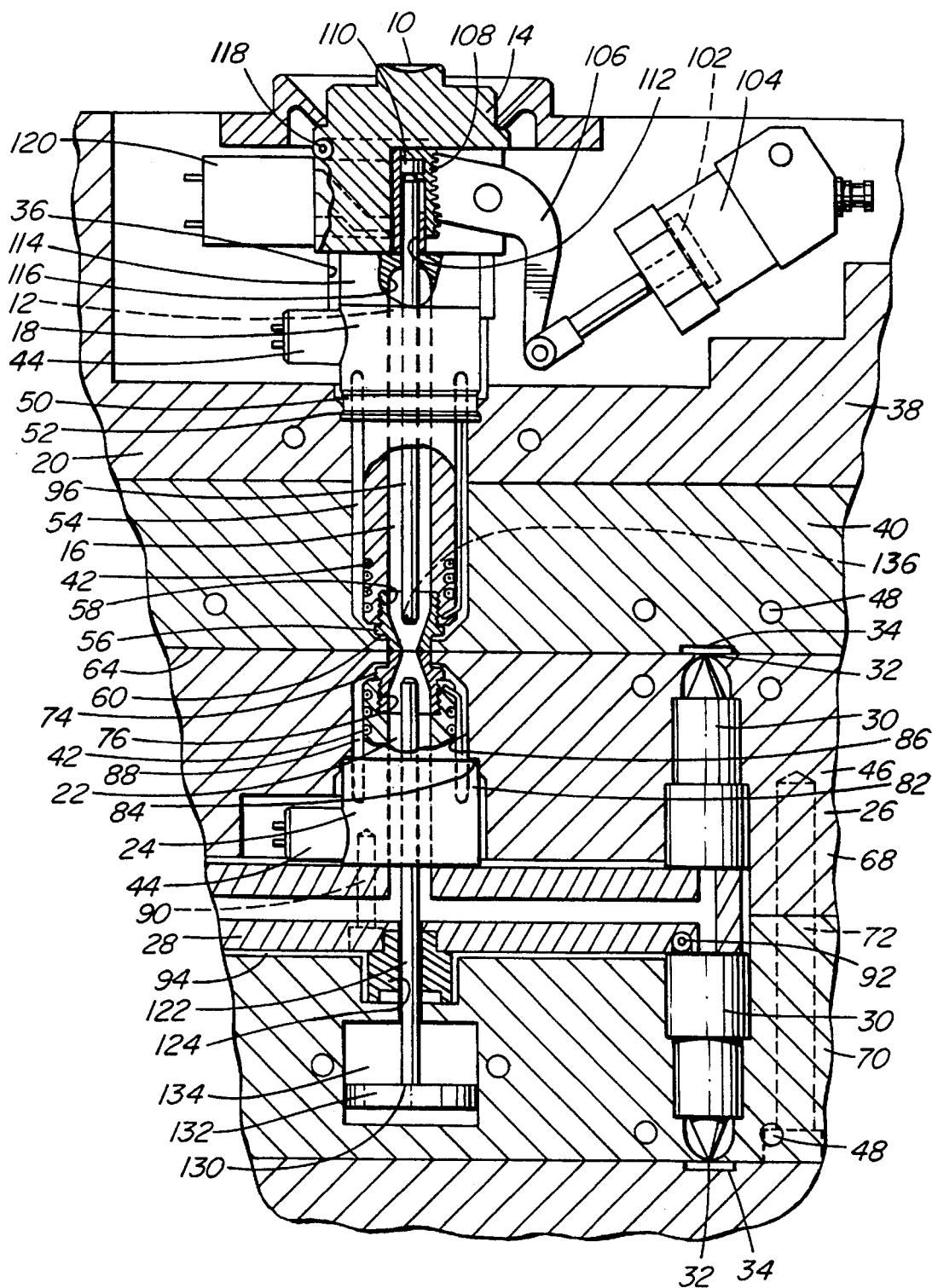
FIG. 1 is a partial sectional view illustrating a portion of a multi-cavity injection molding system with valve gated stack molding apparatus according to a preferred embodiment of the invention.

Reference is first made to FIG. 1 to describe the overall valve gated stack molding system or apparatus. Pressurized melt received from a molding machine (not shown) at a central inlet 10 of a melt passage 12 in an actuator manifold 14 is conveyed through a central bore 16 in an upstream nozzle 18 in a fixed mold platen 20 and a central bore 22 in a downstream nozzle 24 in a movable mold platen 26 to a melt distribution manifold 28. The melt passage 12 branches in the melt distribution manifold 28 to extend to heated nozzles 30 seated in the movable mold platen 26. While there are normally many more nozzles 30 extending in alignment from both sides of the melt distribution manifold 28, only two of them are shown for ease of illustration. The melt passage 12 then extends through each of these nozzles 30 to a gate 32 leading to a cavity 34. The upstream nozzle 18 is seated in a well 36 extending in the spacer plate 38 and the cavity plate 40 which form the fixed mold platen 20. Each of the nozzles is heated by an integral electrical heating element 42 extending to a terminal 44 and the mold 46 is cooled by pumping cooling water through cooling conduits 48. The upstream nozzle 18 has an insulation flange 50 which sits on a circular seat 52 in the spacer plate 38 to provide an insulative air space 54 between the heated nozzle 18 and the surrounding cooled mold 46. In this embodiment, the upstream nozzle 18 has a threaded gate insert 56 screwed into a threaded seat 58 in its front end 60. The gate insert 56 has a front face 62 which is flush with the parting line 64 and forms an upstream gate 66 in alignment with the central bore 16 through the upstream nozzle 18.

The movable mold platen 26 has a rear plate 68 and a front plate 70 which are secured together by bolts 72. The downstream nozzle 24 also has a threaded gate insert 74 screwed into a threaded seat 76. In the closed position shown in FIG. 2, the face 78 of this gate insert 74 abuts against the front face 62 of the other gate insert 56 along the parting line 64. This gate insert 74 similarly forms a downstream gate 80 which is in alignment with the central bore 22 through the downstream nozzle 24. The downstream nozzle 24 also has an insulation flange 82 which sits on a circular seat 84 in the rear plate 68 of the movable mold platen 26. This locates the downstream nozzle 24 in a well 86 with the downstream gate 80 in alignment with the upstream gate 66 and provides an insulative air space 88 between it and the surrounding cooled movable mold platen 26. The downstream nozzle 24 is also secured to the melt distribution manifold 28 by screws 90. The melt distribution manifold 28 is heated by an integral electrical heating element 92 and is secured in place between the nozzles 30 with insulative air spaces 94 extending between it and the adjacent rear and front plates 68, 70 of the movable mold platen 26.

Figure 2:
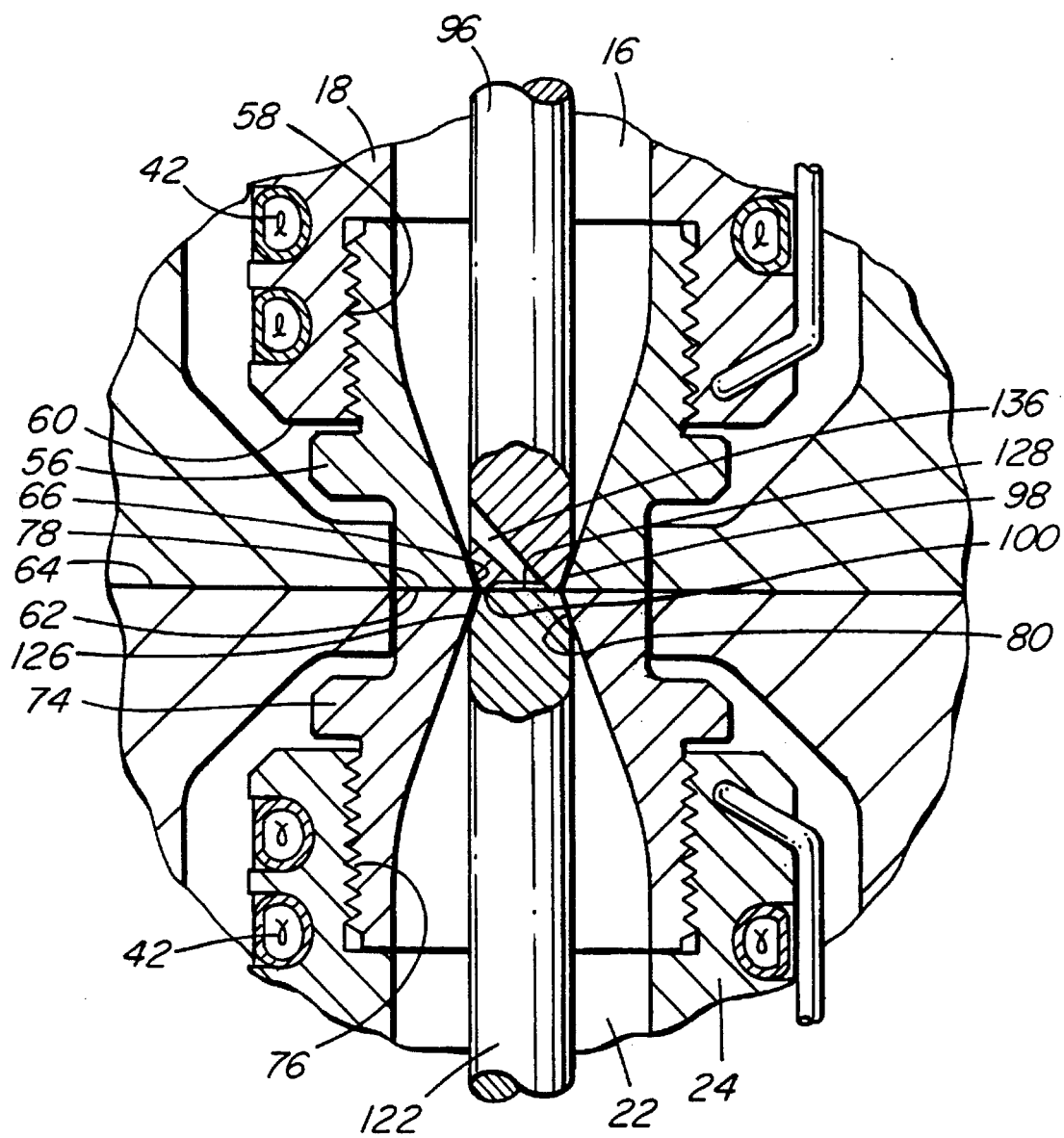
FIG. 2 is a more detailed sectional view showing the opposing tip ends of the elongated valve members in the closed position.

Also referring to FIG. 2, an elongated valve member 96 having a tapered tip 98 with a face 100 is mounted to extend from the actuator manifold 14 into the central bore 16 of the upstream nozzle 18. During the injection cycle, the valve member 96 reciprocates longitudinally between the retracted open position shown in FIG. 1 and the closed position shown in FIG. 2 in which its tapered tip 98 is seated in the upstream gate 66. While various hydraulic or pneumatic actuating mechanisms can be used, in this embodiment the valve member 96 is driven pneumatically with a rack and pinion actuating mechanism similar to that shown in the applicant's U.S. Pat. No. 4,919,606 which issued Apr. 24, 1990. In this arrangement, a piston 102 in a pneumatic cylinder 104 pivots a pinion member 106 which drives a rack member 108 which slides in a slot in the actuator manifold 14 and is attached to the rear end 110 of the valve member 96. The valve member 96 extends through a sealing bore 112 in a valve bushing 114 mounted between the actuator manifold 14 and the upstream nozzle 18. The melt passage 12 extends in the actuator manifold 14 around the rack member 108 from the central inlet 10 to a larger diameter bore 116 in the valve bushing 114 aligned with the central bore 16 in the upstream nozzle 18. The actuator manifold 14 also has an integral heating element 118 with electrical terminals 120 to maintain the temperature of the melt flowing through the melt passage 12.

Another elongated valve member 122 is mounted in the movable mold platen 26 to extend in alignment with the first valve member 96 through a sealing bushing 124 in the melt distribution manifold 28 into the central bore 22 in the downstream nozzle 24. This valve member 122 also has a tapered tip 126 with a face 128 and a rear end 130. The rear end 130 is driven by a piston 132 in a pneumatic cylinder 134 to reciprocate the valve member between the retracted open position shown in FIG. 1 and the closed position shown in FIG. 2 in which its tapered tip 126 is seated in the downstream gate 80. As clearly shown in FIG. 2, the first valve member 96 and upstream gate 66 are aligned with the second valve member 122 and the downstream gate 80. In the closed position, the face 128 of the tip 126 of the second valve member 122 abuts against the face 100 of the tip 98 of the first valve member 96 along the parting line 64. The first valve member 96 has a vent bore 136 which extends diagonally from the face 100 of its tapered tip 98 rearwardly to the melt passage 12 extending around it. This vent bore 136 provides for the escape of melt and/or solidified plastic trapped between the opposing faces 100, 128 of the valve members 96, 122 as they are driven together to the closed position. The face 128 of the second valve member 128 is flat, while the face 100 of the first valve member 96 is slightly concave around the vent bore 136 to allow the trapped melt and/or solidified plastic to escape. In this embodiment, the vent bore 136 tapers slightly inwardly toward the face 100 of the tip 98 of the valve member 96 to allow it to seal and then reopen during the injection cycle. While the first valve member 96 is shown having the diagonal vent bore 136, in other embodiments it can be in the second valve member 122 or in both valve members 96, 122.

In use, the system is assembled as shown and electrical power is applied to the heating elements 42 in the nozzles and the heating elements 92, 118 in the manifolds 14, 28 to heat them to a predetermined operating temperature. Pressurized melt is supplied to the melt passage 12 through the central inlet 10 according to a continuous predetermined injection cycle. During this cycle the mold is opened by the movable platen 26 separating from the fixed platen 20 along the parting line 64 for ejection and controlled pneumatic pressure is applied to the cylinders 104, 134 to reciprocate the valve members 96, 122 between the open and closed positions. With the valve members 96, 122 in the retracted open position and the mold 46 in the closed position as seen in FIG. 1, the pressurized melt flows through the melt passage 12 around the valve member 96 of the upstream nozzle 18 and passes out of the fixed platen 20 through the upstream gate 66 and into the movable platen 26 through the downstream gate 80. Then the melt flows around the valve member 122 of the downstream nozzle 24 and branches in the distribution manifold 28 to flow through the nozzles 30 to the various cavities 34. After the cavities 34 are filled, injection pressure is held momentarily to pack and then pneumatic pressure is applied to the pistons 122, 132 to drive the valve members 96, 122 to the closed position shown in FIG. 2. In the closed position, the tapered tip 98 of the upstream valve member 96 is seated in the upstream gate 66, and the tapered tip 126 of the downstream valve member 122 is seated in the downstream gate 80. As the two faces 100, 128 of the tapered tips 98, 126 come together, the melt and/or solidified plastic trapped between them is forced through the diagonal vent bore 136. This allows the two gates 66, 80 to close completely with the two faces 100, 128 abutting against each other and avoids the formation of a piece of plastic film between them. Injection pressure is then released and after a short cooling period, the mold is opened to eject the molded products from the cavities 34. After ejection, the mold is closed, pneumatic pressure is applied to the cylinders 104, 134 to retract the valve members 96, 122 to the open position, and injection pressure is reapplied to refill the cavities 34. This cycle is repeated continuously with a frequency dependent upon the number and size of the cavities 34 and the type of material being molded.

While the description of the valve gated stack injection molding apparatus has been given with respect to preferred embodiments, it will be evident that various other modifications are possible without departing from the scope of the invention as understood by those skilled in the art and as defined in the following claims.

The embodiments of the invention in which an exclusive property or privilege is claimed is defined as follows:

1. In a valve gated stack injection molding apparatus in which melt flows through a melt passage and passes from a first gate in a fixed platen to an aligned second gate in a movable platen during a predetermined injection cycle in which the movable platen reciprocates between a first position abutting the fixed platen and a second position separated from the fixed platen along a parting line extending between the first gate and the second gate, including a first elongated valve member with a tip having a face mounted in an upstream nozzle seated in the fixed platen to reciprocate between a retracted open position in which the melt flows through the melt passage around the first valve member to the first gate and a closed position in which the tip of the first valve member is seated in the first gate, and a second elongated valve member with a tip having a face mounted in a downstream nozzle seated in the movable platen in alignment with the first elongated valve member, the second valve member being mounted to reciprocate between a retracted open position in which the melt flows from the second gate through the melt passage around the second valve member and a closed position in which the tip of the second valve member is seated in the second gate, having the improvement wherein;

at least one of the first and second elongated valve members has a vent bore extending diagonally from the face of the tip to the melt passage extending around the at least one valve member, whereby the faces of the tips of the first and second valve members abut against each other in the closed position.

2. A valve gated stack injection molding apparatus as claimed in claim 1 wherein the vent bore tapers inwardly toward the face of the tip of the at least one valve member.

\* \* \* \* \*